United States Patent [19]

Netzer

[11] Patent Number: 4,517,750
[45] Date of Patent: May 21, 1985

[54] VERTICAL INDICATING METHOD AND DEVICE

[76] Inventor: Yishay Netzer, 20 Gilboa St., Haifa, Israel, 32716

[21] Appl. No.: 590,069

[22] Filed: Mar. 15, 1984

Related U.S. Application Data

[63] Continuation-in-part of Ser. No. 275,602, Jun. 22, 1981, Pat. No. 4,451,991.

[51] Int. Cl.³ .............................. G01C 9/06; G01C 9/08
[52] U.S. Cl. ........................................ 33/396; 33/366; 33/327
[58] Field of Search ................ 33/366, 345, 346, 316, 33/317, 319, 327, 391, 396, 397, 356, 364, 363 Q

[56] References Cited

U.S. PATENT DOCUMENTS

| | | | |
|---|---|---|---|
| 689,323 | 12/1981 | Ouimby | 33/396 |
| 959,759 | 5/1910 | Kouns | 33/396 |
| 1,634,934 | 7/1927 | Donaldson | 33/396 |
| 2,912,767 | 11/1959 | Mittelmann | 33/366 |
| 2,924,022 | 2/1960 | Callahan | 33/220 |
| 3,069,783 | 12/1962 | Dinsmore | 33/364 |
| 3,520,065 | 7/1970 | Pace | 33/215 |
| 3,945,128 | 3/1976 | Weiss | 33/366 |
| 3,975,831 | 8/1976 | Jysky et al. | 33/333 |
| 4,096,538 | 6/1978 | Schimming | 33/396 |
| 4,099,334 | 7/1978 | Kuzin et al. | 33/396 |
| 4,163,325 | 8/1979 | Hughes | 33/346 |
| 4,398,352 | 8/1983 | Maine | 33/356 |

*Primary Examiner*—Willis Little
*Attorney, Agent, or Firm*—Lackenbach Siegel Marzullo Presta & Aronson

[57] ABSTRACT

A device for sensing angular deviation from the vertical. A housing forming a spherical chamber contains pendulous element comprising a circular plate immersed in a liquid having a low viscosity. The center of the plate is supported for rotational movement about two perpendicular axes of rotation by a pivot at the top of a normally vertical support rod aligned with the vertical axis of the chamber extending upwardly from the bottom of the chamber. The plate provides a couple with the liquid. Electrical pick-offs associated with the two axes of rotation provide an electrical signal proportional to the angular tilt of the circular plate about the two axes relative to the housing.

12 Claims, 3 Drawing Figures

VERTICAL INDICATING METHOD AND DEVICE

This is a continuation-in-part of Ser. No. 275,602, filed June 22, 1981, now U.S. Pat. No. 4,451,991.

BACKGROUND OF THE INVENTION

This invention describes a method and apparatus for indicating the vertical. More particularly, it relates to a pendulous type of vertical indicator.

Vertical indicating devices are needed in various situations, particularly in military fire-control system applications and navigation and guidance applications. Pendulous vertical indicators actually determine the direction of total acceleration which aligns with the vertical. In the presence of lateral accelerations or shocks due to motion of the vehicle in which the pendulum is mounted, the direction indicated by the pendulum is erroneous because the pendulum actually responds to the vector sum of gravity acceleration $-g$ and the lateral accelerations, and thus may accurately only under static conditions.

Pendulums may be classified as either mathematical or compound. The mathematical pendulum is characterized by a mass concentrated at a single point at distance l from the pivot axis. This pendulum exists only as an idealized model and its calculated natural period is given by $$2\pi\sqrt{\frac{l}{g}}.$$

Real-life or compound pendulums, on the other hand, have a mass which is distributed along its body. As is well known to those skilled in the art, the compound pendulum has an equivalent or effective length l which is related to the distance l' of its center-of-mass from the pivot axis, and its moment of inertia I around this axis. The length is given by $I/ml'$, where m is the total mass of the pendulum.

DESCRIPTION OF THE PRIOR ART

The compound pendulum, and the idealized methematical pendulum as well, have the disadvantage that when constructed to a practical length, the natural period is relatively short and the period's reciprocal—the natural frequency—is relatively high. The importance of a low natural frequency is that for lateral vibrations at frequencies above the natural frequency the pendulum is relatively unaffected. The angular reading error is, then, essentially $x/l$, where x is the amplitude of vibrations and l is the effective length of the pendulum. Thus, it is seen that increasing l both increases the frequency range of satisfactory operation and decreases the amplitude of the error.

Prior art pendulous-vertical-indicators have used several methods in order to overcome the problems of a compound pendulum which is inherently limited in physical length. By far, the most accurate and expensive method is to realize an effective length which is equal to the radius of the earth. This kind of pendulum is often called a Schuler-turned pendulum, and the large effective length is realized by various methods involving linear accelero-meters, angular accelerometers or gyroscopes. It can be shown that a Schuler-tuned pendulum indicates the true vertical regardless of motions of the vehicle in which it is mounted. A typical mechanization of a Schuler-tuned pendulum is described in U.S. Pat. No. 3,015,962. However, this kind of pendulum is expensive, complicated, and cumbersome and is appropriate only for very demanding applications, mainly in inertial navigation systems.

For less demanding applications, a pendulum and gyroscope combination is often used. The gyroscope is slaved to the long term, or averaged, orientation of the pendulum and maintains this orientation against vehicle movements. This type of augmented pendulum is called a Vertical-Gyro and is used in applications such as airborne automatic pilots. For still less demanding applications, bare compound pendulums have been used with performance limited by the relatively high natural frequency, or enchanced by various attachments to the pendulum, such as described in U.S. Pat. No. 3,945,128 and U.S. Pat. No. 4,163,325.

SUMMARY OF THE INVENTION

It is, therefore, one object of this invention to provide a pendulous vertical indicating sensor which is compact, low in cost and still attains a very long equivalent length with a resulting low natural frequency.

A second object of the present invention is to provide a pendulum with a very high immunity to shock and vibration.

A third object of the invention is to provide a pendulum with very low loading in the bearings. This results in a high reading accuracy virtually limited by the quality of the angular pick-off which translates the angular deviation of the pendulum into an output voltage.

A fourth object of the invention is to provide a pendulum which gives the instantaneous reading of the output angle over an angular range of 360°.

A fifth object of the invention is to provide a vertical indicating sensor having a pendulum rotatable about at least one horizontal axis of rotation.

A sixth object of the invention is to provide a vertical indicating sensor having a pendulum rotatable about a pair of mutually perpendicular axes of rotation.

GENERAL DESCRIPTION OF THE INVENTION

The subject of this invention is a passive compound pendulum which achieves a very long effective length in a relatively compact mechanical envelope. As previously described, the effective length of a compound pendulum is directly proportional to its moment of inertia and inversely proportional to the product of its mass and the distance between the pivot axis and the center of mass—hereinafter referred to as pendulosity. For a given set of envelope dimensions and coefficient of friction in the bearings, it is obvious that increasing the effective length of a pendulum by increasing the inertia means more mass and results in more loading on the bearings with resultant increased friction. On the other hand, for a given inertia and bearing friction, the effective length can be increased by decreasing the pendulosity. The restoring torque is, thus, decreased in comparison with the frictional torque in the bearings which again impairs the accuracy of the reading.

The present invention circumvents the above difficulties by having most of the pendulum's inertia provided by a liquid rotor rather than by a solid pendulous element. The liquid mass does not load the bearings and the effective load on the bearings is due only to a light solid pendulous, rotor element. The solid rotor is coupled to the liquid to enhance its moment of inertia and its angular position is read by a pick-off. The result is a long effective length and small friction errors. Furthermore, by neutrally floating the rotor in the same liquid, the residual loading on the bearings can be virtually eliminated, with the result that the pendulosity can be further reduced to achieve still longer effective length.

The present invention provides a sensor having either a single horizontal axis of rotation or one having a pair of mutually perpendicular axes of rotation.

DESCRIPTION OF THE PREFERRED EMBODIMENT

Figure 1:
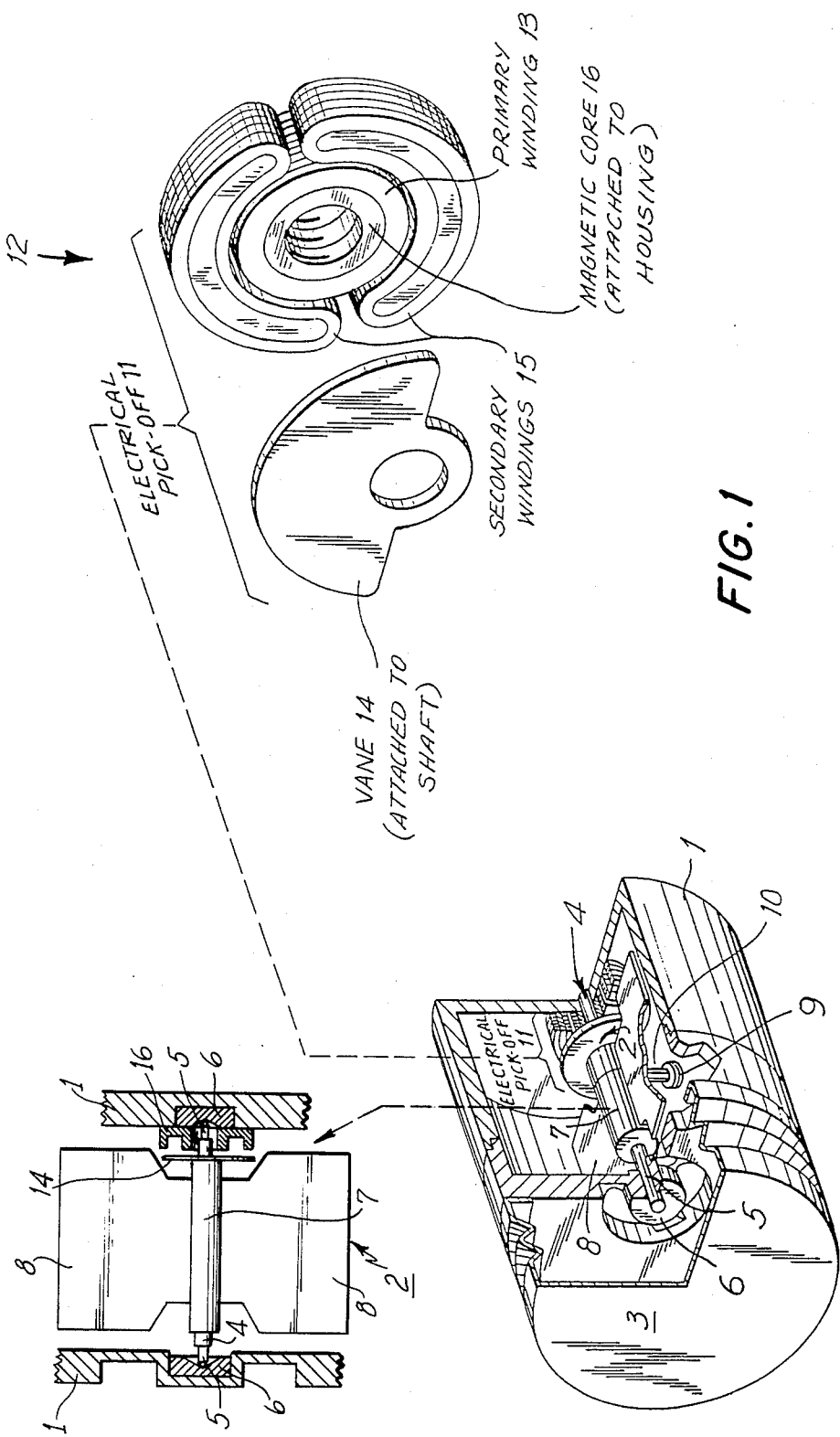
FIG. 1 is a perspective partially cut-away and partially exploded view of a single-axis vertical sensor according to the invention.

To more fully describe the invention, reference is made to the accompanying drawing which shows a cutaway view of the sensor.

As shown in the drawings, the preferred embodiment of the invention comprises a housing of cylindrical shape 1 containing a liquid in which the pendulum rotor assembly 2 is immersed. The housing also includes a bellows 3, which accommodates temperature induced changes in the volume of the liquid. The rotor assembly includes a shaft 4 made of the same material as the housing, aluminum, in this case. At the ends of the rotor shaft there are hard conical pivots 5 made, for example, from tungsten-carbide. The clearance between the pivots and the mating jewels 6 is maintained against temperature variations by virtue of the equal coefficient of thermal expansion of the housing and the shaft; this clearance is typically 2-3 mils. The cylinderical shaft is surrounded by a plastic tube 7 which supports two thin fiberglass paddles 8. The density and volume of the tube provide neutral buoyancy to the rotor assembly and relieve any loading on the bearings to minimize the friction. Neutral buoyancy is not necessary to the operation of the preferred embodiment but is desirable, when very high accuracy or when immunity to extreme shock and vibration is desired. The tow paddles attached to the rotor assembly are used to couple the motion of the rotor assembly to the liquid and, thus, increase its moment of inertia. The liquid has, preferably, a high density and low viscosity. Fluro-Carbon type FC-104 manufactured by the 3M Company—which has a density of about 2 gm/cm$^3$ and a viscosity of 0.8 centistoke—is a liquid of the desired type. The high density is desirable for increased inertia while the low viscosity is desirable for reducing rotational motion in the pendulum caused by viscous coupling to the case. However, low viscosity may result in excessively small damping of motions induced in the rotor due to lateral accelerations acting on the housing. Thus, the selection of the actual fluid viscosity should depend on the specific use of the invention. The pendulosity of the rotor is adjustable by means of a small bob, 9, mounted on a threaded shaft, 10, and is used to adjust the effective length of the pendulum.

The angular position of rotor assembly 2 relative to housing 1 may be read by means of a pick-off 11 shown in FIG. 1 in exploded perspective. Pick-off 11 is preferably a non-contact type and specifically in the embodiment is a rotary-variable-differential-transformer (RVDT). Pick-off 11 includes a femormagnetic vane 14 attached to rotor 2 and pick-off transformer 12. Transformer 12 includes an inner portion comprising an inner primary winding 13 and an outer portion comprising a pair of outer secondary windings 15. Said primary and secondary windings are mounted on magnetic core 16 which is secured to housing 1. An alternating current in primary winding 13 induces identical voltages in each of secondary windings 15 when vane 14 is aligned with the plane of symmetry separating said two secondary windings 15. When shaft 4 rotates relative to housing 1, or vice-versa, a differential output voltage of secondary windings 15 occurs which is proportional to the difference between the magnetic coupling of primary winding 13 and each of secondary windings 15. This difference is proportional to the angular displacement of vane 14 from its symmetrical position relative to the secondary windings.

During operation the bob is attracted by gravity to align with the vertical direction. The total moment of inertia is determined mostly by the liquid's inertia and opposes motion of the rotor due to short term cross accelerations. This is equivalent to saying that the effective length of the pendulum is increased as described above. It is seen that for a given pendulosity the effective length is dependent on the liquid's inertia which by itself is dependent on the housing radius R, or more accurately proportional to $R^4$. For illustration, in a model 30 mm long in which R=12 mm an effective length of 12 m is easily achieveable using the above mentioned liquid. The effect of friction in this model showed repeatability of $\frac{1}{8}°$, which could be further improved by neutrally floating the rotor, as already described.

A simple, low cost and compact pendulous vertical sensor has been described. It features a high ratio of effective length to mechanical dimensions and high performance which is achieved by means of a liquid mass coupled to a pendulous element, where the small bearing loading can be further decreased by neutrally floating the pendulous element. Obviously, many modifications and variations of the present invention are possible in the light of the above description, such as the use of different types of materials, bearings, liquid coupling means and so on. Another modification would be the two-axes counterpart of the invention as described, in which the pendulous element is free to swing in two mutually perpendicular axes and provided with a suitable angular pick-off means so as to indicate the housing tilt in two axes. It is, therefore, understood that within the scope of the disclosed inventive concept, the invention may be practiced otherwise than specifically described.

With the above embodiment and principles thereof in mind, a second embodiment of the invention utilizing the same general principle expounded hereinabove will now be set forth. The second embodiment is a two-axis sensor device 18, rather than the one-axis sensor described above in relation to FIG. 1.

Figure 2:
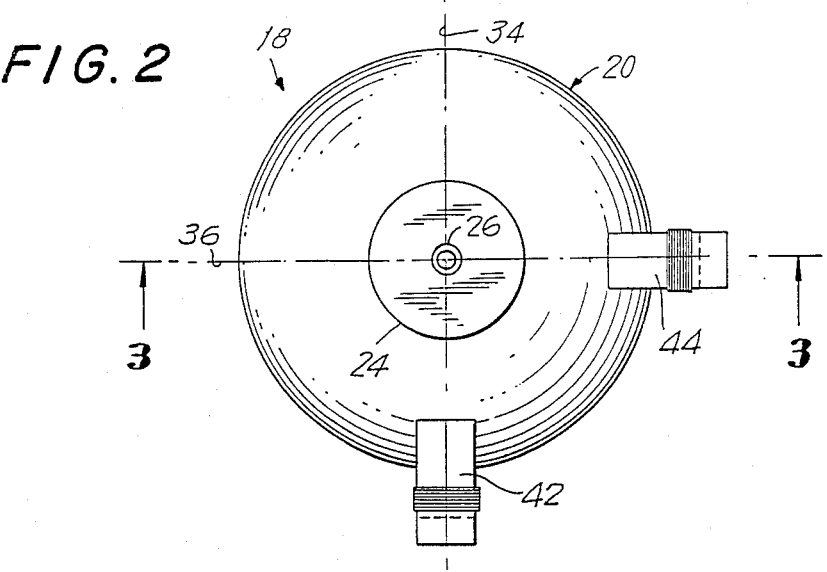
FIG. 2 is a top view of a double-axis vertical sensor according to the invention.
Figure 3:
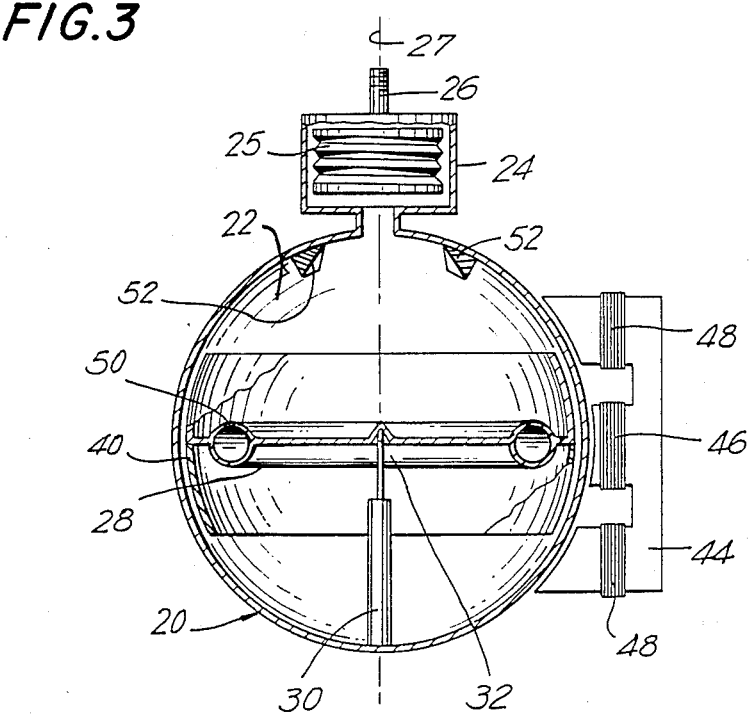
FIG. 3 is a view taken through line 3—3 of FIG. 2.

FIGS. 2 and 3 illustrate sensor device 18 including a housing 20 forming a spherical chamber 22 that is filled with a liquid. The liquid preferably has a high density and a low viscosity. Fluro-carbon type FC-104 manufactured by the 3M Company, which has a density of about 2 gm/cm$^3$ and a viscosity of about 0.8 centistoke is a liquid of the desired type. The high density is desirable for increased inertia; and the low viscosity is desirable for reducing rotational motion in the pendulum caused by viscous coupling to the housing. The low viscosity, however, may result in excessively small damping of any residual motions induced in the rotor because of lateral accelarations acting on the housing. Thus, the selection of the actual fluid viscosity should depend on the specific use of the invention.

A filling cavity 24 positioned over housing 20 is provided with a bellows 25 that compensates for temperature-induced variations of the liquid volume. Bellows 25 is in fact a float. A filler passage 26 with a nozzle fitting leads to cavity 24 which in turn opens into spherical chamber 22. Filling cavity 24 is preferably aligned with the vertical axis 27 of spherical chamber 22. A circular plate 28 is positioned preferably midway across chamber 22 between the walls of housing 20. As illustrated in FIGS. 2 and 3, plate 28 is in a horizontal position. A nominally vertical support rod 30 aligned with vertical axis 27 of chamber 22 is positioned in chamber 22 and extends from the bottom center of housing 20, to which rod 30 is connected, to a top bearing pivot point 32. Plate 28 is rotatably supported at its center by pivot point 32 in such a way that plate 28 tilts about a pair of first and second horizontal axes 34 and 36 respectively, which are perpendicular to one another. Plate 28 may also rotate, but this is of no effect because of the rotational symmetry of the plate.

Plate 28 being pivoted and effectively coupled with the liquid is fixed relative to the vertical since as detailed below it is supported above its center of gravity. The movement of plate 28 around axes 34 and 36 is analogous to the rotational movement of rotor 2 and paddles 8 around shaft 4 in the embodiment of FIG. 1, except that plate 28 is free to tilt about more than on axis rotation, rather than the single axis of rotation of shaft 4. As plate 28 tilts about either axis 34 or 36, the opposite sides of plate 28 from the particular axis of rotation act in the same manner as the paddles 8 of the first embodiment illustrated in FIG. 1.

Skirt 40 made of a magnetic material, such as iron, is attached around the rim of plate 28. Skirt 40 extends equally above and below the rim of plate 28 and is configured to the spherical inner surface of housing 20.

First and second E-core differential transformers 42 and 44 respectively are positioned at the outer surface of housing 20 are mounted in axial alignment with axes 34 and 36 respectively. Transformers 42 and 44 in combination with the magnetic skirt 40 serve to measure the tilt of plate 28 with respect to housing 20 about axes 34 and 36 respectively and act as angular electrical pick-offs providing an electrical signal proportional to the angular tilt of plate 28 about either axis 34 or 36 relative to housing 20. Each transformer has a primary winding 46 and two identical secondary windings 48 with primary winding 46 positioned at dead center of secondary winding 48. An alternating primary current in primary winding 46 induces identical voltages in each of the pairs of secondary windings 48 when plate 28 is in its centered position. When plate 28 tilts relative to either axis 34 or 36, a differential output voltage of secondary windings 48 occurs which is proportional to the difference between the magnetic coupling of primary winding 46 and each of secondary windings 48. This difference is proportional to the displacement of magnetic skirt 40 from its centered position illustrated in FIG. 3. The current in the primary winding 46 induces identical voltages in secondary windings 48 only in the neutral position of plate 28. The difference of the voltages induced in the two secondaries is proportional to the tilt angle of housing 20 in the approximate axis since plate 28 stays essentially horizontal. Pick-offs 42 and 44 operate analogously to pick-off 11 of the embodiment of FIG. 1. Further explanations on the operation of transformers 42 and 44 relating to sensing the movements of magnetic skirt 40 can be found in standard works on the subject of transducers and pick-offs. One such reference is Electronics in Engineering, by W. Roland Hill, McGraw-Hill Book Company, Inc. (1949) pp. 238-256, and in particular on pp. 248-250. Another reference is "Angular Position Transducer", U.S. Pat. No. 3,949,339, issued to Kennedy, Apr. 6, 1976. These references likewise are applicable to the angular electrical pick-off referred to relating to the first single-axis embodiment of the invention shown in FIG. 1. The applicant considers both these references to be a part of the present application.

The total buoyancy of the moving, or pendulous, element, that is, plate 28 and skirt 40, which is the pendulum of sensor device 18, that is supported by pivot point 32, is made close to neutral by a circular hollow bead 50 incorporated in plate 28.

The construction and arrangement of bead 50 is such that the center of mass of the pendulous element, that is, plate 28 and skirt 40 and including bead 50, is slightly below pivot point 32, and the pendulous element is almost neutrally floated. As a result, the loading on pivot point 32 is relieved, thus minimizing friction and increasing the accuracy of the electrical signal sent out by the transformers 42 and 44.

Mechanical stops 52 are positioned at the upper portion of the inner surface of the wall of housing 20 about the vertical center of housing 20 in order to limit the rotational movements of plate 28 about axes 34 and 36 to a predetermined range.

It can be seen that the operation of sensor device 18 is directly analogous to that of the sensor device shown in FIG. 1 and described previously. That is to say, the total moment of inertia is determined by the liquid's inertia which opposes motion of the pendulous element, that is, plate 28, magnetic skirt 40, and bead 50, because of short term cross accelerations. It is seen that for a given pendulosity the theoretical effective length relative to the mechanical dimensions of the pendulous element is dependent on the liquid's inertia which by itself is dependent on the housing radius R, or more accurately, proportional to $R^5$.

The materials used throughout are lightweight, with plate 28 being of a particularly lightweight material, such as plastic.

The embodiment of the invention shown as sensor device 18 is a simple, low cost and compact pendulous vertical sensor as herein described. It features a high ratio of theoretical effective length to mechanical dimensions and a high performance which is achieved by means of a liquid mass coupled to a pendulous element, where the small bearing loading can be further decreased by neutrally floating the pendulous element. Obviously, many modifications and variations of the present invention are possible in the light of the above description, such as the use of particular materials, bearings, liquid coupling means, and so on. It is, therefore, understood that within the scope of the disclosed inventive concept, the invention may be practiced otherwise than specifically described.

What is claimed is:

1. A generally small, compact verticality sensor of the type having a pendulous element comprising:

a housing and a pendulous element contained therein and immersed in a liquid having a relatively low viscosity; axial means for supporting said pendulous element for rotational movement about two axes of rotation; said pendulous element including means for coupling said pendulous element to said liquid; said means for coupling being for substantially increasing the moment of inertia of said pendulous element without increasing the loading on said axial means, whereby the ratio of the effective length relative to the mechanical dimensions of said pendulous element is increased and angular electrical pick-off means associated with said pendulous element for providing an electrical signal proportional to the angular tilt of said pendulous element about said two axes relative to said housing.

2. The sensor according to claim 1, wherein said liquid has a high density.

3. The sensor according to claim 2, wherein said liquid has a density of about 2 gm/cm$^3$ and a viscosity of about 0.8 centistoke.

4. The sensor according to claim 3, wherein said two axes of rotation are perpendicular one to another.

5. The sensor according to claim 4, wherein said pick-off means includes two electrical pick-offs associated with said two axes of rotation, each of said electrical pick-offs providing an electrical signal proportional to the tilt of said pendulous element about said two axes of rotation relative to said housing.

6. The sensor according to claim 5, wherein said housing forms a spherical chamber containing said pendulous element and said liquid.

7. The sensor according to claim 6, said housing containing a vertical support rod having a top having a pivot means, said pendulous element including a normally horizontal circular plate centrally positioned upon said pivot top, said pivot means being for rotatably supporting said circular plate for movement for a horizontal position to tilted positions about said two axes, wherein said means for coupling are the sides of said plate opposite the axis about which said plate is rotating.

8. The sensor according to claim 7 further including a skirt disposed around the rim of said plate, said skirt being made of a magnetic material, said two angular electrical pick-off means being for sensing the movements of said magnetic skirt as said plate is rotated about said two axes, said plate and said skirt comprising said pendulous element.

9. The sensor according to claim 8, wherein a circular hollow bead means is incorporated with said circular plate and is centered about said pivot means and spaced from said magnetic skirt, said bead means being for making the total buoyancy of said pendulous element approximately neutral, wherein the mass of said pendulous element is slightly below said pivot top, whereby loading on said pivot top is relieved thus minimizing friction and increasing the accuracy of said signal.

10. The sensor according to claim 9, wherein said housing is spherical and said circular plate is positioned midway within said housing.

11. The sensor according to claim 10, further including stop means connected to the upper inner surface of said housing for limiting the movements of said pendulous element to a predetermined range.

12. The sensor according to claim 11, wherein said plate is made of a relatively light material, such as plastic.

* * * * *